United States Patent
VanLaningham et al.

(10) Patent No.: US 11,287,050 B2
(45) Date of Patent: Mar. 29, 2022

(54) SOLENOID VALVE WITH CRIMP FITTING

(71) Applicant: Automatic Switch Company, Florham Park, NJ (US)

(72) Inventors: Erik VanLaningham, Princeton, NJ (US); Gregory J. Volz, Pequannock Township, NJ (US); Kenneth Taylor, Rockaway, NJ (US); Jeffrey Loprete, Boonton Township, NJ (US); Fred Pond, LaGrange, OH (US)

(73) Assignee: AUTOMATIC SWITCH COMPANY, Florham Park, NJ (US)

( * ) Notice: Subject to any disclaimer, the term of this patent is extended or adjusted under 35 U.S.C. 154(b) by 0 days.

(21) Appl. No.: 16/401,363

(22) Filed: May 2, 2019

(65) Prior Publication Data
US 2020/0347954 A1 Nov. 5, 2020

(51) Int. Cl.
*F16K 31/06* (2006.01)
*F01L 1/344* (2006.01)
*H01F 7/16* (2006.01)

(52) U.S. Cl.
CPC ........ *F16K 31/0665* (2013.01); *F01L 1/3442* (2013.01); *F16K 31/0613* (2013.01); *H01F 7/1607* (2013.01)

(58) Field of Classification Search
CPC ......... F16L 25/10; F16L 37/086; F16L 19/06; F16L 19/046; F16L 19/061; F16L 19/106; F16L 19/00; F16L 37/091; F16L 37/098; F01L 1/3442
See application file for complete search history.

(56) References Cited

U.S. PATENT DOCUMENTS

| | | | |
|---|---|---|---|
| 3,563,265 A | 2/1971 | Graham | |
| 3,924,882 A * | 12/1975 | Ellis | F16L 37/091 |
| | | | 285/148.19 |
| 4,488,346 A | 12/1984 | Archer | |
| 4,608,739 A | 9/1986 | Miller | |

(Continued)

FOREIGN PATENT DOCUMENTS

| | | |
|---|---|---|
| CH | 689794 A5 | 11/1999 |
| CN | 206770710 U | 12/2017 |

(Continued)

OTHER PUBLICATIONS

"0-0.6Mpa Brass 2 Way Rotatable Welding Machine Solenoid Valve AC 220V," Uxcelll.com. Model No. a12040300ux0089. Accessed Nov. 2018.

(Continued)

*Primary Examiner* — Angelisa L. Hicks
(74) *Attorney, Agent, or Firm* — Mackey Law Firm PLLC

(57) ABSTRACT

A valve can include a valve body having an inlet, an outlet, an orifice disposed fluidically between the inlet and the outlet, a fitting having a first end configured to be removably coupled with at least one of the inlet and the outlet of the valve body and a second end configured to be coupled to a fluid conduit, and a retainer configured to at least partially resist uncoupling of the fitting from the valve body. A fitting can be configured to slidingly and sealingly engage at least a portion of an inlet and/or outlet bore. A retainer can be configured to couple with a valve body and a fitting. A fitting can be or include a crimp or press fitting, in whole or in part.

17 Claims, 7 Drawing Sheets

(56) References Cited

U.S. PATENT DOCUMENTS

| | | | |
|---|---|---|---|
| 4,637,433 A | 1/1987 | Stoll | |
| 4,693,502 A | 9/1987 | Oetiker | |
| 4,911,484 A | 3/1990 | Hackforth | |
| 5,341,566 A | 8/1994 | Quitschau et al. | |
| 5,346,176 A | 9/1994 | Fujimoto et al. | |
| 5,581,862 A | 12/1996 | Choma et al. | |
| 5,722,696 A | 3/1998 | Taneya | |
| 5,799,986 A * | 9/1998 | Corbett | B29C 45/1671 285/133.21 |
| 6,257,626 B1 * | 7/2001 | Campau | F16L 37/0985 285/319 |
| 6,375,233 B1 | 4/2002 | Friedmann et al. | |
| 6,405,752 B1 | 6/2002 | Fritsch et al. | |
| 6,419,278 B1 | 7/2002 | Cunningham | |
| 6,527,249 B2 | 3/2003 | Niimi et al. | |
| 6,739,578 B2 | 5/2004 | Barton et al. | |
| 6,945,512 B2 * | 9/2005 | Carpenter | F16L 27/12 251/150 |
| 7,108,242 B2 | 9/2006 | Goossens et al. | |
| 7,210,708 B2 | 5/2007 | Muto | |
| 7,316,429 B2 | 1/2008 | Viegener | |
| 7,331,565 B2 | 2/2008 | Mills et al. | |
| 7,805,989 B2 | 10/2010 | Thierbach et al. | |
| 7,922,150 B2 | 4/2011 | Cripps et al. | |
| 8,081,053 B2 | 12/2011 | Yamagata et al. | |
| 8,113,550 B2 | 2/2012 | Noto et al. | |
| 8,267,435 B2 * | 9/2012 | Hellfeier | F02M 35/10144 285/321 |
| 8,322,684 B2 | 12/2012 | Otsuka et al. | |
| 8,360,477 B2 * | 1/2013 | Flynn | F16L 27/026 285/233 |
| 8,603,557 B2 | 12/2013 | De et al. | |
| 9,052,023 B2 | 6/2015 | Janousek | |
| 9,556,981 B2 | 1/2017 | Williams et al. | |
| 9,568,124 B2 | 2/2017 | Vijayadevaraj et al. | |
| 9,651,174 B2 | 5/2017 | Lechuga et al. | |
| 9,964,241 B2 | 5/2018 | Lutz et al. | |
| 2003/0197369 A1 | 10/2003 | Fukano et al. | |
| 2006/0108553 A1 | 5/2006 | Mora | |
| 2007/0007761 A1 * | 1/2007 | Nisel | F16L 41/021 285/133.11 |
| 2008/0111369 A1 | 5/2008 | Pettinaroli | |
| 2008/0174108 A1 * | 7/2008 | Lambert | F16L 37/30 285/18 |
| 2009/0057594 A1 | 3/2009 | Tsujimoto | |
| 2010/0007274 A1 | 3/2010 | Xie | |
| 2011/0140417 A1 * | 6/2011 | Kluss | B25B 27/10 285/345 |
| 2014/0361535 A1 * | 12/2014 | Lutz | F16L 23/024 285/336 |
| 2015/0084329 A1 * | 3/2015 | Freudendahl | F16L 37/53 285/91 |
| 2015/0267849 A1 * | 9/2015 | Henrich | F16L 17/035 285/325 |
| 2016/0281894 A1 * | 9/2016 | Freter | F16L 37/0841 |
| 2017/0261113 A1 | 9/2017 | Sato | |
| 2018/0313480 A1 | 11/2018 | Lawrence et al. | |

FOREIGN PATENT DOCUMENTS

| | | |
|---|---|---|
| DE | 202009016436 U1 | 5/2010 |
| DE | 102013209112 A1 | 11/2014 |
| EP | 0343395 B1 | 6/1996 |
| EP | 1245893 A1 | 9/2004 |
| EP | 1607669 A2 | 5/2009 |
| GB | 2166827 B | 5/1986 |
| KR | 100666316 B1 | 1/2007 |
| KR | 2018017868 A | 2/2018 |
| WO | 2014042218 A1 | 3/2014 |
| WO | 2016106314 A1 | 6/2016 |
| WO | 2017182294 A1 | 10/2017 |
| WO | 201877561 A1 | 5/2018 |

OTHER PUBLICATIONS

"Boost Control Solenoid," AEM Performance Electronics, aemelectronics.com, Jun. 3, 2014.
"How to Install a Water Softener," Aaron Stickley, The Spruce. Accessed Sep. 26, 2018.
Viega Propress Fittings, SupplyHouse.com. Accessed Mar. 6, 2019.
"Digiten DC 12V 1/4" Inlet Feed Water Solenoid Valve Quick Connect N/C normally Closed, Oct. 14, 2015, amazon.com.
Interational Search Report and Written Opinion dated Jul. 21, 2020 for International Application No. PCT/US2020/031204.

* cited by examiner

SOLENOID VALVE WITH CRIMP FITTING

CROSS REFERENCE TO RELATED APPLICATIONS

Not applicable.

STATEMENT REGARDING FEDERALLY SPONSORED RESEARCH OR DEVELOPMENT

Not applicable.

REFERENCE TO APPENDIX

Not applicable.

BACKGROUND OF THE INVENTION

Field of the Invention

The present disclosure relates generally to valves and more specifically relates to solenoid valves and fittings for solenoid valves.

Description of the Related Art

Flow control systems are common in process and manufacturing systems, such as in sterile, aseptic, physiological and food applications, among others, including applications in hazardous or harsh environments. It can be important to accurately monitor and control various parameters in such systems, including flow rates, valve positions, pressure, valve health and other aspects of fluid control components. Accordingly, fluid control systems and valves that provide rapid and accurate control of fluids are called for in numerous industries. Further, some industries and applications call for fluid control systems and valves that incorporate features relating to safety, system monitoring and protection against failures, which can include considerations such as material types, connection types and installation requirements.

In addition, different types of fluid or flow control systems can vary with regard to the type or types of piping or other conduits used from application to application, as well as the type or types of fittings that may be required or desired for connecting two or more system components, such as valves, fluid conduits and others. Other considerations can include the speed or ease of valve installation, removal or repair, which in at least some cases can be affected by the types of fittings involved and the manner in which a fitting connects to a valve or other system component. Another factor can include installation costs, which can be affected by the time involved with a valve installation (or removal, etc.) among other things, such as the costs of repairing or replacing a bad or faulty fitting connection, Accordingly, there is a need in the art for improved valves, such as solenoid valves, and valve fittings having features for more efficient and flexible installation into or removal from flow control systems. Additionally, there is a need in the art for improved solenoid valves and valve systems for cooperating with other fluid system components and providing advantageous fitting and connection features. The disclosures and teachings of the present disclosure are directed to systems and methods for improved valves, valve systems and valve connections.

BRIEF SUMMARY OF THE INVENTION

In at least one embodiment, a valve can include a valve body having an inlet that allows fluid flow into the valve body, an outlet that allows fluid flow out of the valve body and an orifice disposed fluidically between the inlet and the outlet, a fitting having a first end configured to be removably coupled with at least one of the inlet and the outlet of the valve body and a second end configured to be coupled to a fluid conduit, and a retainer configured to at least partially resist uncoupling of the fitting from the valve body, such as when the fitting is coupled to the valve body. A valve body can include one or more bores, such as a first, second, or other bore, and one or more ends of a fitting can be configured to slidingly and sealingly engage at least a portion of one or more bores. One or more retainers can be configured to couple with at least one of a valve body or portion thereof, such as an inlet, outlet, or other portion, and one or more ends or other portions of a fitting. One or more bores can be disposed in one or more inlets and/or one or more outlets of a valve body.

A valve can include a plurality of bores, which can include a second, third, or other bore. A bore can be disposed in one or more inlets of a valve body and a bore can be disposed in one or more outlets of a valve body. One or more ends or other portions of one or more fittings can be configured to slidingly and/or sealingly engage or otherwise couple with at least a portion of one or more bores. A valve can include one or more bores and one or more corresponding or other fittings. A first or other bore can be disposed in an inlet of a valve body and a second or other bore can be disposed in an outlet of a valve body. A first or other end of one or more fittings can be configured to slidingly and/or sealingly engage at least a portion of a second or other bore.

A valve can include one or more bores, such as a first bore and a second bore, having a common central longitudinal or other axis, or no common axis. One or more fittings can be or include a crimp fitting, such as a crimp fitting having one or more ends or other portions configured to be coupled to a fluid conduit or other fluid carrier by crimping, which can include by way of coupling with a crimp ring or other crimp or press style coupler, internally, externally, or otherwise.

A first or other end of a fitting can include one or more seal grooves and can include one or more seals coupled to the one or more seal groves, such as one or more seals configured to sealingly engage an interior surface or other portion of one or more bores, inlet, outlets, or fluid paths. A valve body can include one or more slots or other openings in fluid communication with one or more bores and at least a portion of one or more retainers can be configured to couple with one or more slots or other openings. One or more retainers can include one or more fingers configured to be at least partially disposed within a bore, such as when a retainer is at least partially coupled with a slot or other portion of a valve. One or more fingers can be configured to at least partially resist movement of one or more fittings relative to a bore or other valve portion.

An end or other portion of one or more fittings can include a collar, such as a collar having a larger or other outside dimension than one or more other portions of a fitting. One or more stops can be disposed at least partially within a valve, such as fluidically between an orifice and a bore, and a collar can be configured to contact a stop, such as when a fitting is in one or more positions, such as a fully inserted or other position. A valve body can include a slot in fluid communication with a bore and a collar can be configured to be disposed longitudinally or otherwise between or otherwise relative to a stop and a slot, such as when the fitting is in one or more positions, such as an inserted, coupled, or other position.

At least a portion of a retainer can be configured to couple with a slot, and a retainer can include one or more fingers configured to be at least partially disposed within a bore, such as on a side of a collar opposite one or more stops, e.g., when a fitting is in one or more inserted positions. One or more seal grooves can be disposed in a collar or other portion of a fitting and one or more seals can be coupled to one or more seal grooves and configured to sealingly engage an interior or other surface of one or more bores. A second or other end of one or more fittings can include one or more seal grooves, such as seal grooves that extend radially outwardly from an interior surface of a fitting and can include one or more seals coupled to the one or more seal grooves.

In at least one embodiment, a valve can include a valve body having an inlet that allows fluid flow into the valve body, an outlet that allows fluid flow out of the valve body and an orifice disposed fluidically between the inlet and the outlet, a fitting having a first end configured to be removably coupled with at least one of the inlet and the outlet of the valve body and a second end configured to be coupled to a fluid conduit, and a retainer configured to at least partially resist uncoupling of the fitting from the valve body, such as when the fitting is coupled to the valve body. The inlet can include a first bore and the outlet can include a second bore. The first end of the fitting can be configured to slidingly and sealingly engage at least a portion of the first bore, and the first end of the fitting can be configured to slidingly and sealingly engage at least a portion of the second bore. A retainer can be configured to couple with at least one of the valve body and the first end of the fitting.

A fitting can be or include a crimp fitting or crimp fitting portion, in whole or in part, separately or in combination with one or more other types of fittings or fitting portions. One or more ends of the fitting can be configured to be coupled to a fluid conduit by crimping or pressing. A fitting can be a first fitting and a valve can include a second fitting having a first end configured to slidingly and sealingly engage at least a portion of a first bore and at least a portion of a second bore. First and second or other fittings can be configured to be optionally and/or interchangeably connectable to one or more of the inlet and outlet of a valve, or other portions of a valve. An inlet can include a first slot in fluid communication with a first bore and an outlet can include a second slot in fluid communication with a second bore. A valve can include one or more retainers, such as a retainer configured to be disposed at least partially through at least one of the first and second slots and to couple with one or more fittings at least partially inside at least one of a first, second or other bore. A fitting can include one or more collars having one or more shoulders or other portions and one or more retainers can be configured to engage one or more shoulders or other portions of one or more collars.

DETAILED DESCRIPTION

Figure 1:
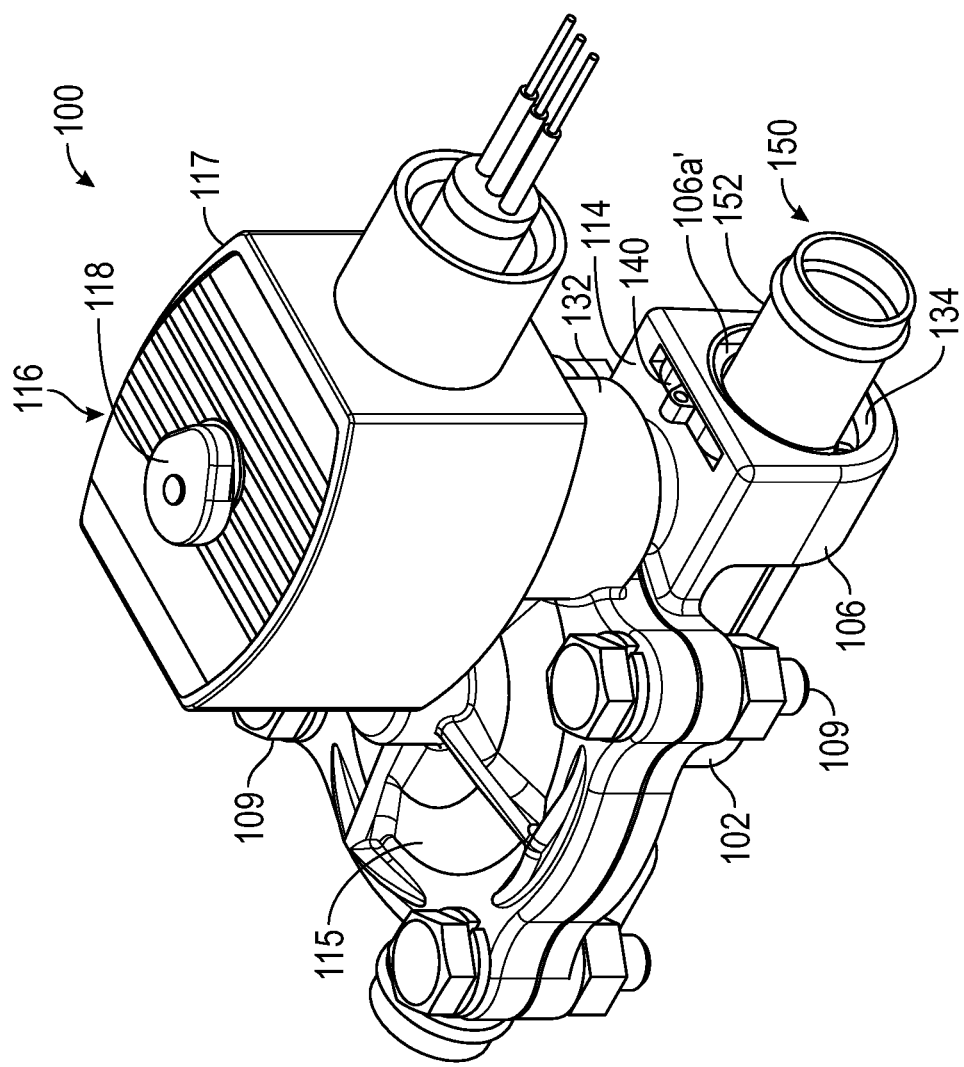
FIG. 1 is a perspective view of one of many embodiments of a valve according to the disclosure.

The Figures described above and the written description of specific structures and functions below are not presented to limit the scope of what Applicants have invented or the scope of the appended claims. Rather, the Figures and written description are provided to teach any person skilled in the art to make and use the invention(s) for which patent protection is sought. Those skilled in the art will appreciate that not all features of a commercial embodiment of the disclosure are described or shown for the sake of clarity and understanding. Persons of skill in this art will also appreciate that the development of an actual commercial embodiment incorporating aspects of the present disclosure can require numerous implementation-specific decisions to achieve the developer's ultimate goal for the commercial embodiment(s). Such implementation-specific decisions may include, and likely are not limited to, compliance with system-related, business-related, government-related and other constraints, which may vary by specific implementation, location and from time to time. While a developer's efforts might be complex and time-consuming in an absolute sense, such efforts would be, nevertheless, a routine undertaking for those of skill in the art having the benefits of this disclosure. It must be understood that the embodiment(s) disclosed and taught herein are susceptible to numerous and various modifications and alternative forms. The use of a singular term, such as, but not limited to, "a," is not intended as limiting of the number of items. The use of relational terms, such as, but not limited to, "top," "bottom," "left," "right," "upper," "lower," "down," "up," "side," "first," "second," ("third" et seq.), "inlet," "outlet" and the like are used in the written description for clarity in specific reference to the Figures and are not intended to limit the scope of the disclosure or the appended claims unless otherwise indicated. The terms "couple," "coupled," "coupling," "coupler," and like terms are used broadly herein and can include any method or device for securing, binding, bonding, fastening, attaching, joining, inserting therein, forming thereon or therein, communicating, or otherwise associating, for example, mechanically, magnetically, electrically, chemically, operably, directly or indirectly with intermediate elements, one or more pieces of members together and can further include without limitation integrally forming one member with another in a unity fashion. The coupling can occur in any direction, including rotationally. The terms "include" and "such as" are illustrative and not limitative, and the word "can" means "can, but need not" unless otherwise indicated. Notwithstanding any other language in the present disclosure, the embodiment(s) shown in the drawings are examples presented for purposes of illustration and explanation and are not the only embodiments of the subject(s) hereof.

Applicants have created systems and methods for improved valves and crimp fittings for valves. Applicants have created systems and methods for valves having one or more crimp fittings, which can include coupling or uncoupling crimp fittings to or from valves in a modular fashion. Applicants have created systems and methods for cartridge style crimp fittings for valves. In at least one embodiment, a valve can be adapted for removable coupling with one or more crimp fittings. Applicants have created systems and methods for advantageous manufacture of valves and crimp fittings for valves. In at least one embodiment, a valve can include one or more crimp fittings adapted for sliding and sealing engagement with an inlet and/or outlet bore. In at least one embodiment, a crimp fitting can have one or more ends adapted for crimped coupling with a fluid conduit and one or more ends adapted for sliding engagement with a valve body, inlet or outlet. A system for fluid flow can include a valve having one or more bores and one or more crimp fittings adapted for sealing engagement with at least one of the bores. One or more aspects and embodiments of the disclosure will be described in further detail below with reference to the Figures.

Figure 2:
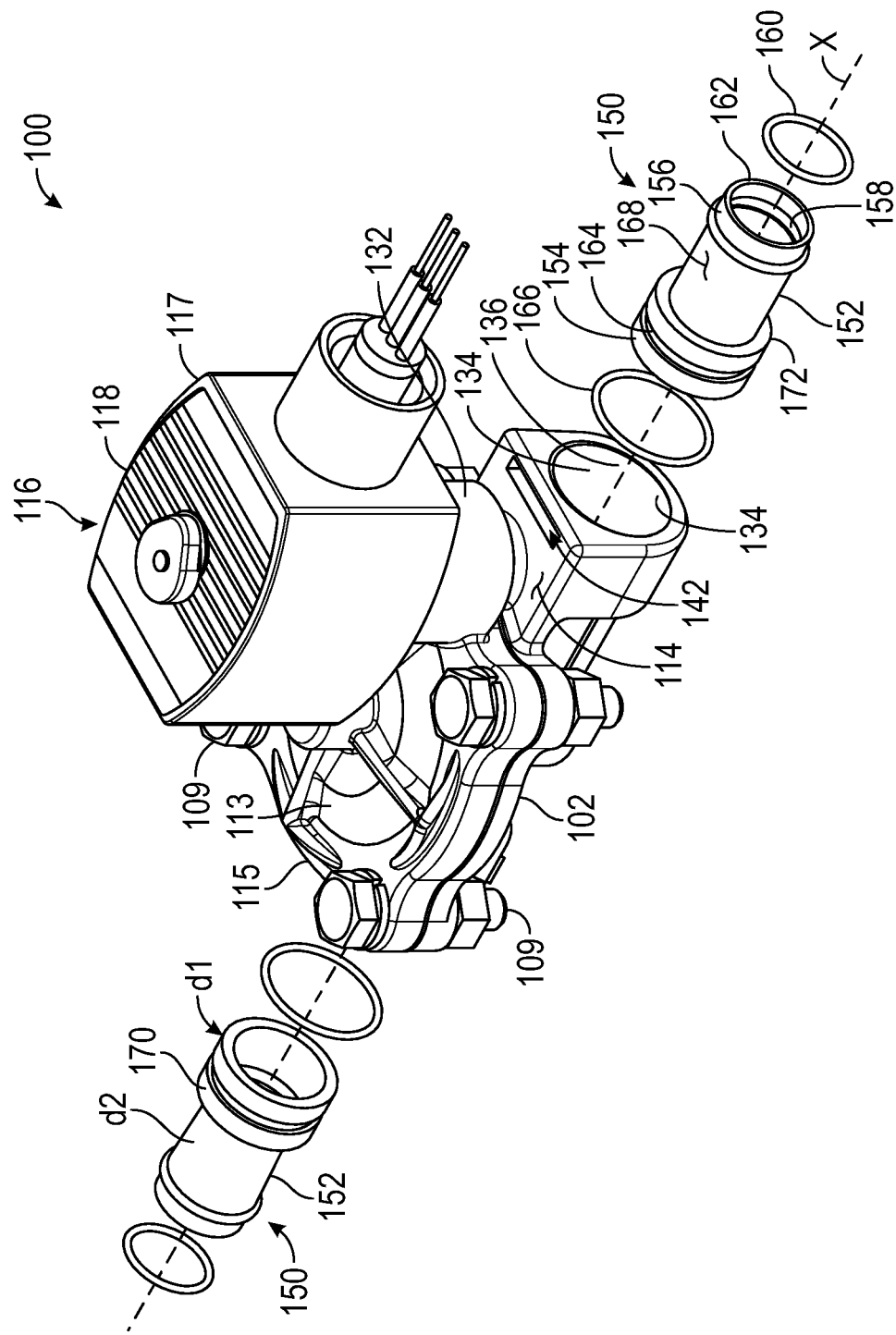
FIG. 2 is an exploded perspective view of the valve of FIG. 1.
Figure 3A:
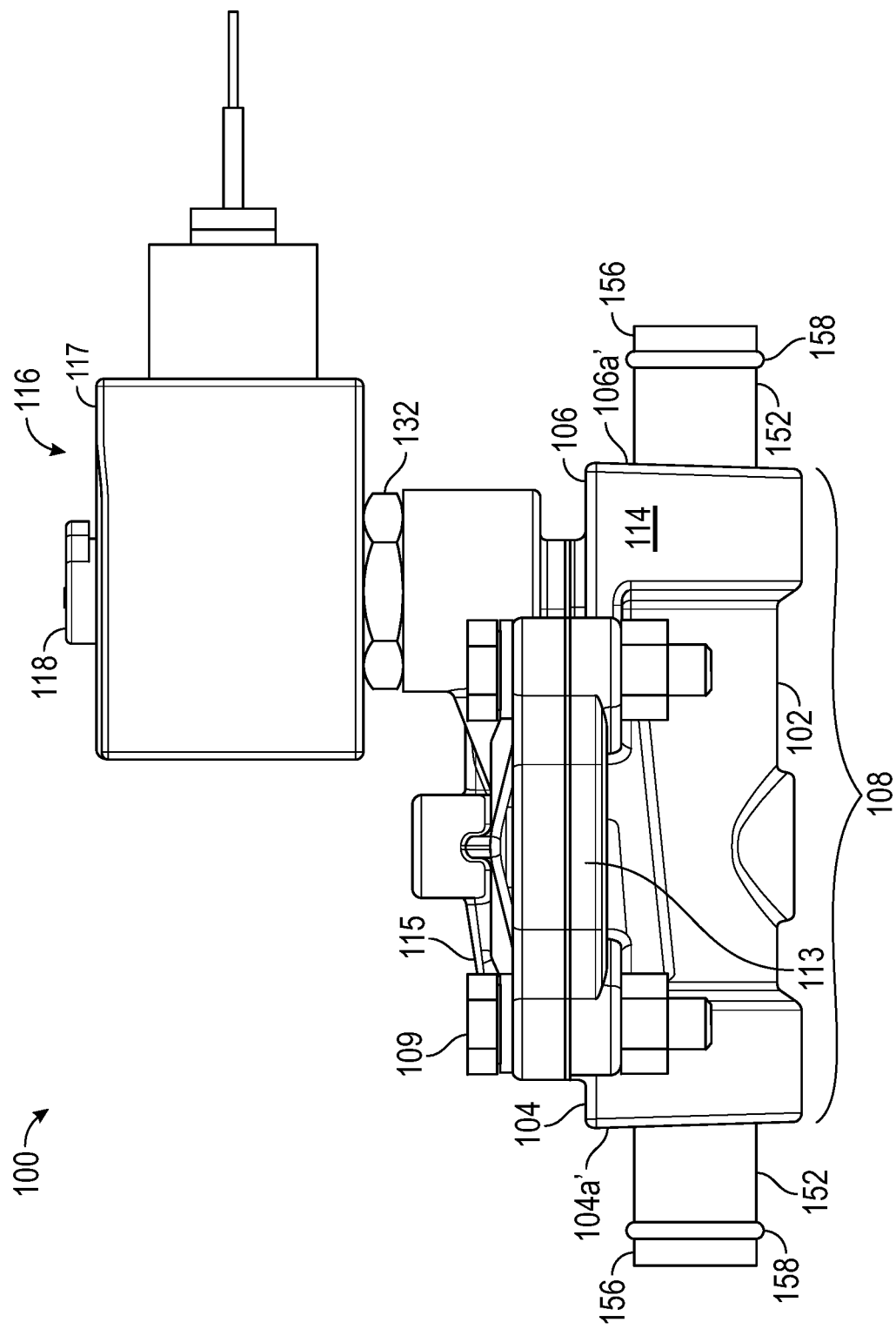
FIG. 3A is a side view of the valve of FIG. 1.
Figure 3B:
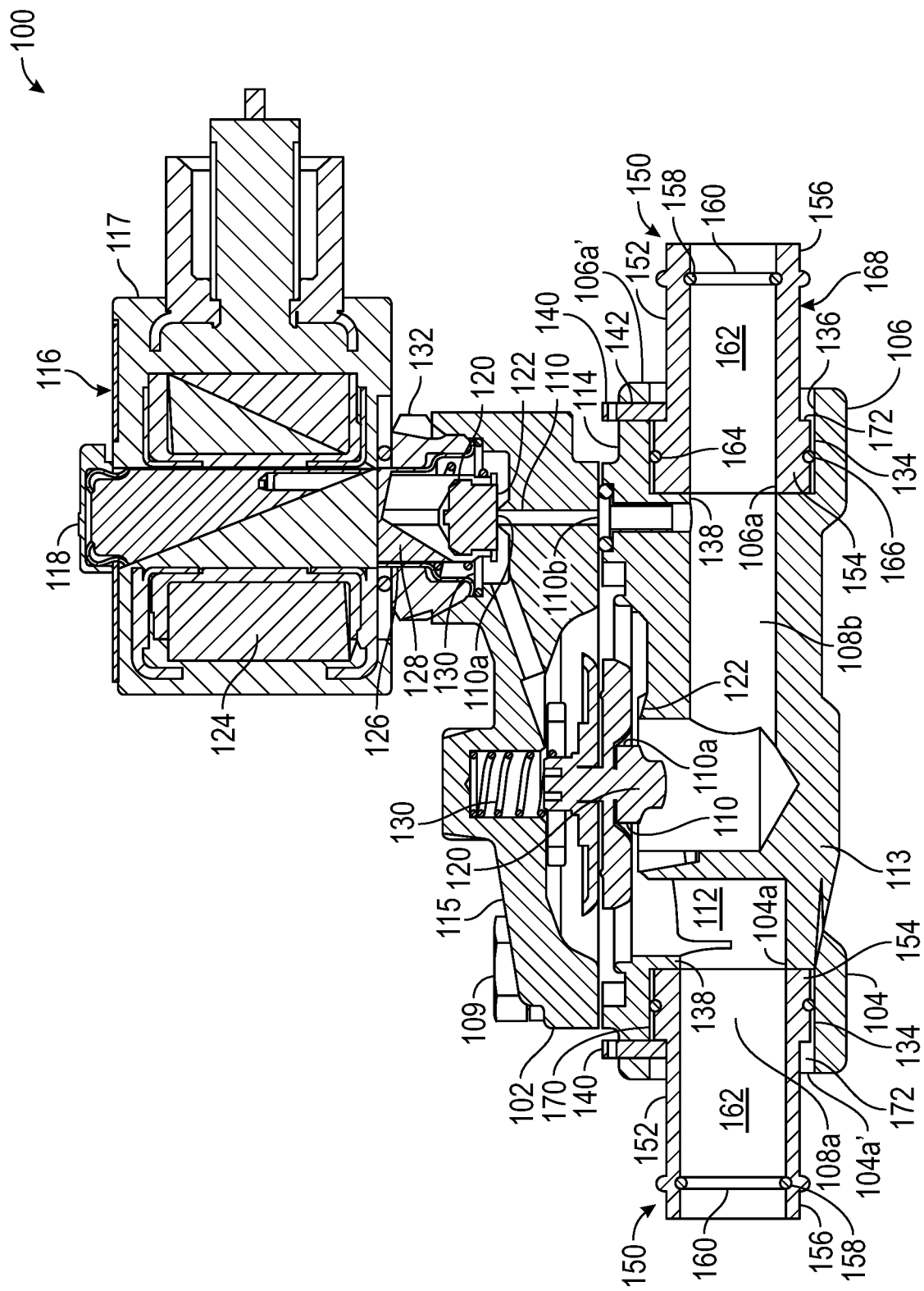
FIG. 3B is a side cross-sectional view of the valve of FIG. 1.
Figure 4:
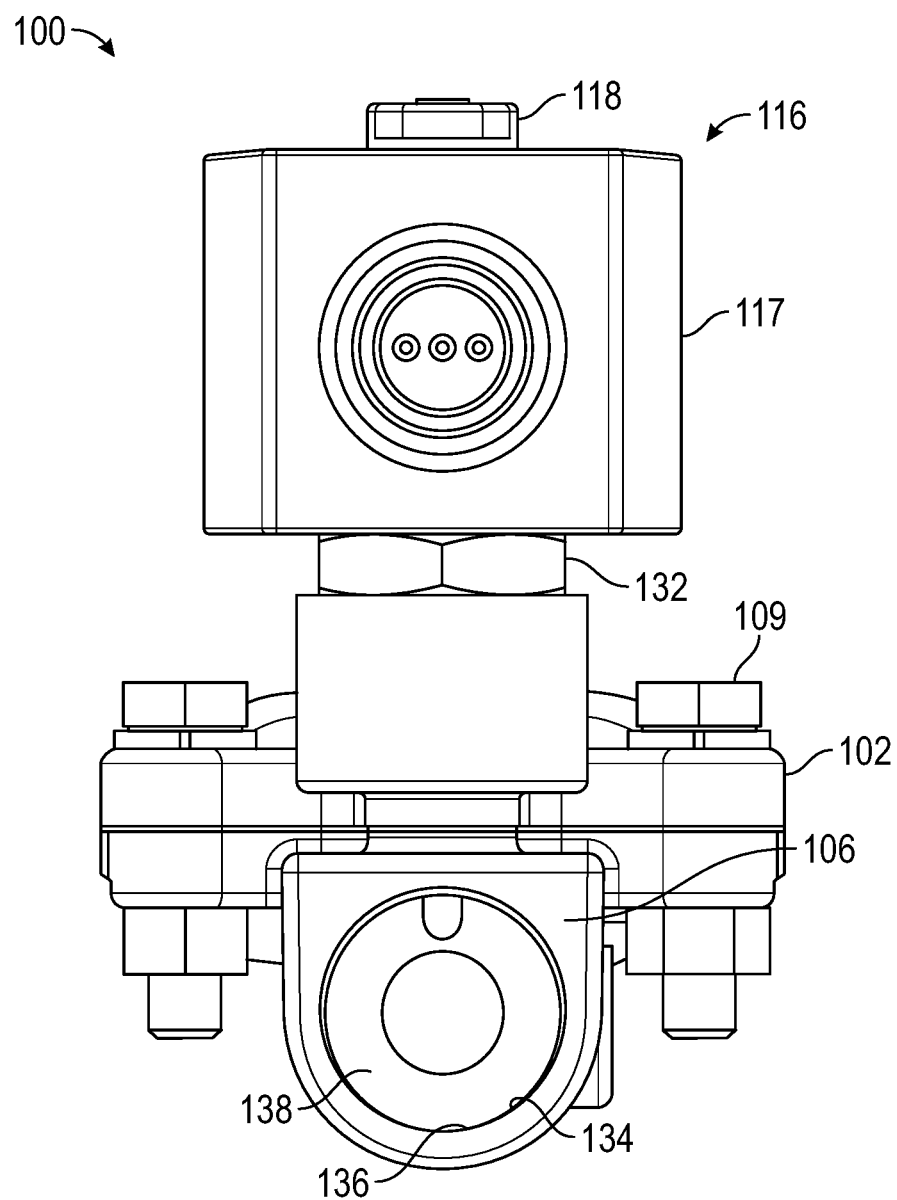
FIG. 4 is an end view of the valve of FIG. 1.
Figure 5:
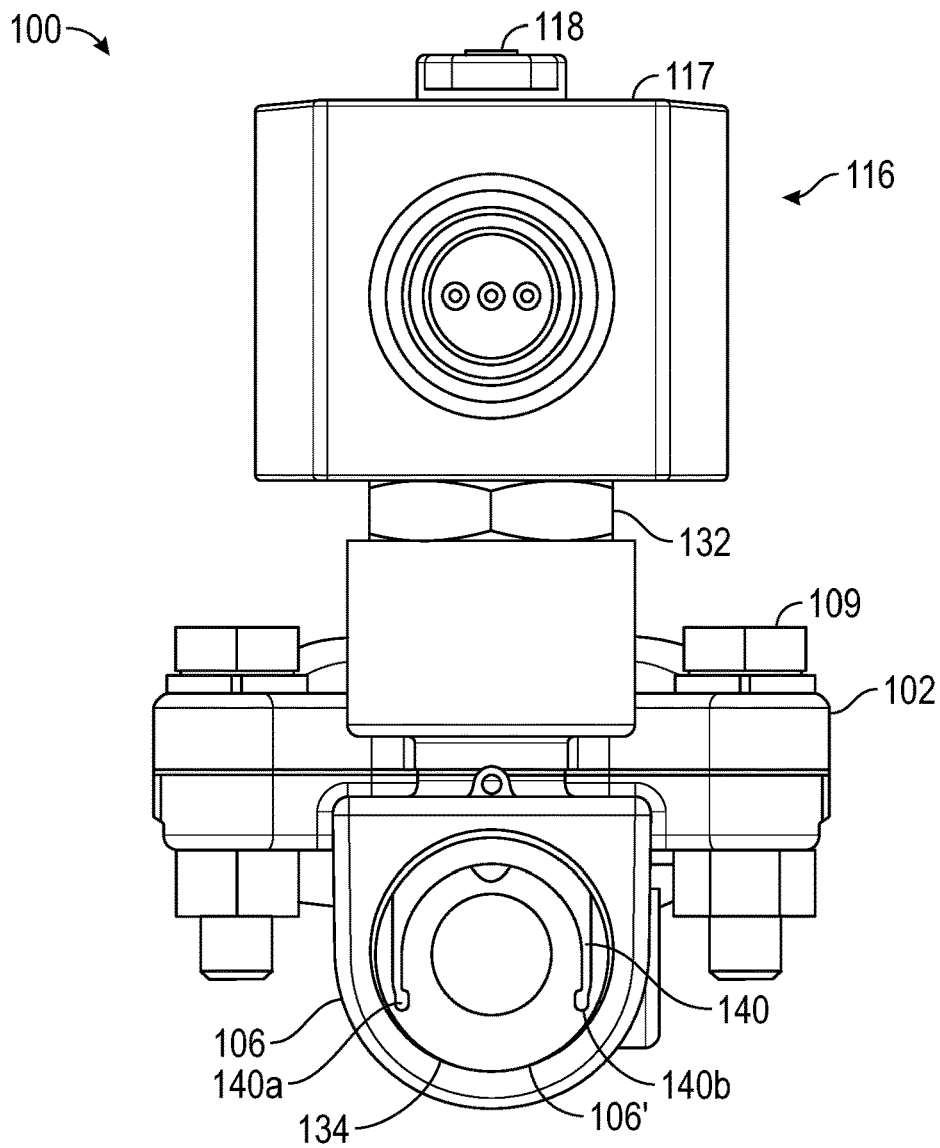
FIG. 5 is another end view of the valve of FIG. 1.
Figure 6:
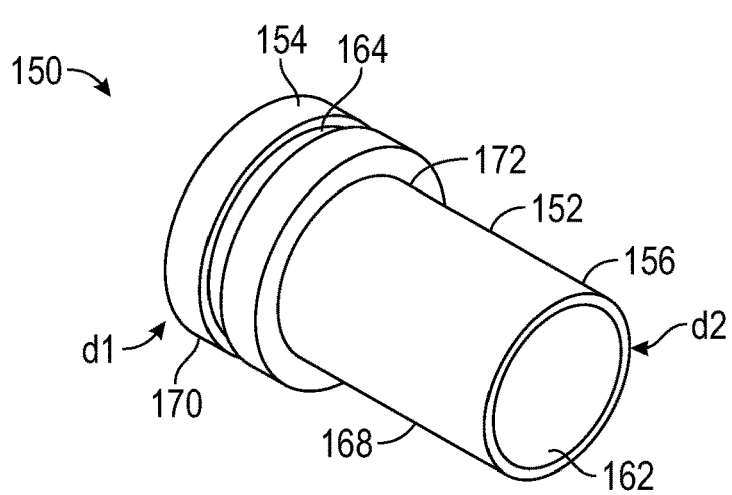
FIG. 6 is a perspective view of one of many embodiments of a valve fitting according to the disclosure.
Figure 7:
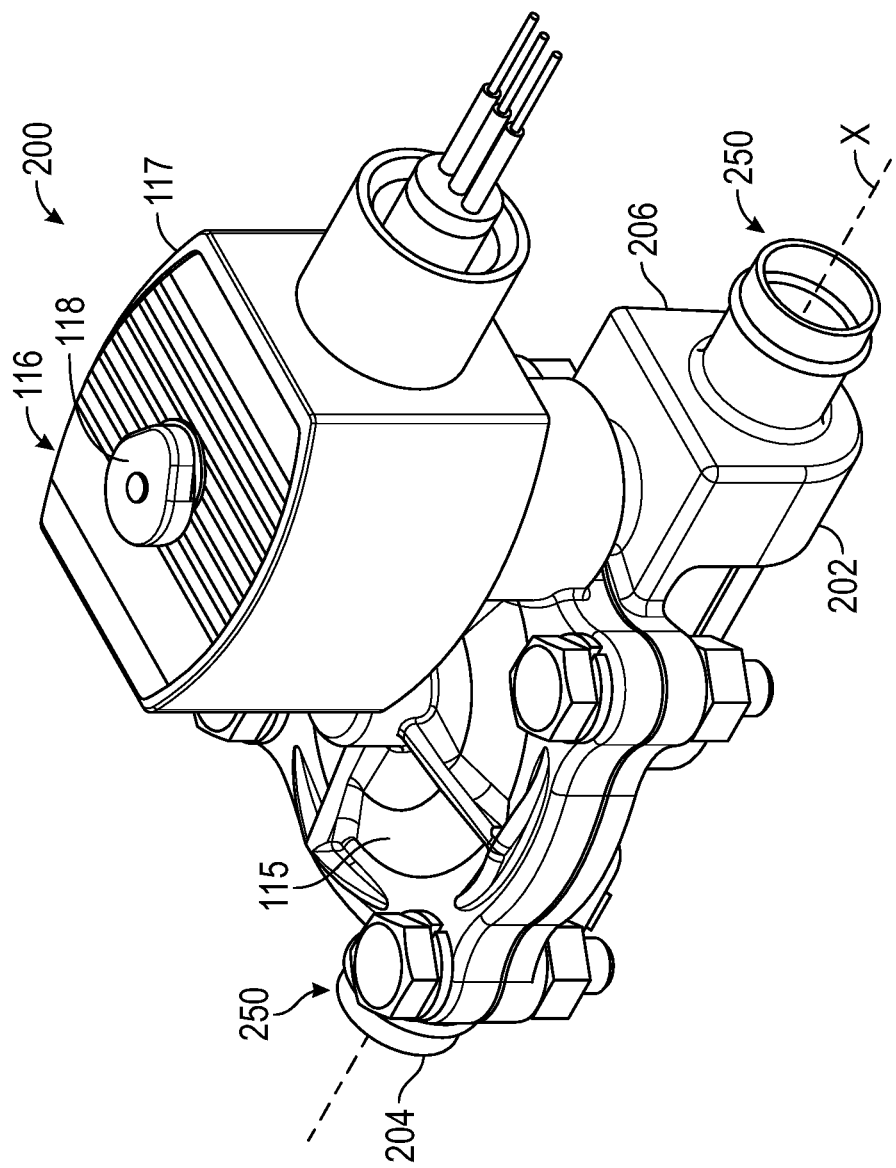
FIG. 7 is a perspective view of another of many embodiments of a valve according to the disclosure.

FIG. 1 is a perspective view of one of many embodiments of a valve according to the disclosure. FIG. 2 is an exploded perspective view of the valve of FIG. 1. FIG. 3A is a side view of the valve of FIG. 1. FIG. 3B is a side cross-sectional view of the valve of FIG. 1. FIG. 4 is an end view of the valve of FIG. 1. FIG. 5 is another end view of the valve of FIG. 1. FIG. 6 is a perspective view of one of many embodiments of a valve fitting according to the disclosure. FIG. 7 is a perspective view of another of many embodiments of a valve according to the disclosure. FIGS. 1-7 will be described in conjunction with one another.

In at least one embodiment, a solenoid valve 100 can include a valve body 102, such as a casing, enclosure, bowl, or housing, for enclosing, protecting or otherwise supporting one or more other valve components, and can include one or more inlets 104 for fluid flow into the valve and one or more outlets 106 for fluid flow out of the valve. Valve body 102 can be or include a single, unitary body or can include a plurality of valve body portions coupled together. Valve body 102 can be formed in any shape or manner according to an implementation of the disclosure and valve 100 can include any number of bodies 102 or body portions according to a particular implementation, any of which can be coupled with one another in any applicable fashion, which can, but need not, include the use of one or more couplers for coupling two or more valve components together, such as male couplers, female couplers, fasteners, receivers, adhesives or other coupling structure(s), separately or in combination.

Inlet 104 can include a plurality of inlet components or other inlet portions coupled or otherwise disposed in fluid communication. For example, inlet 104 can include one or more inlet openings, such as an opening 104a in an inside surface 112 and an opening 104a' in an outside surface 114 of body 102, for allowing fluid flow in one or more directions between the inside and outside of body 102. Openings 104a, 104a' can have the same or different cross-sectional shapes and/or dimensions, which can be any shape(s) and dimension(s) according to a particular application. Inlet 104 can be configured to couple with an inlet conduit (not shown) for routing fluid or otherwise allowing fluid to move into or through inlet 104, such as from a location outside of valve 100 to or through inlet opening(s) 104a.

Inlet 104 can be configured to couple with other structure in a valve or fluid system, such as pipes, tubing, hoses, fluid sources, fluid receivers, fluid destinations, or other conduits or flow control components, which can include being configured to couple with a separate or separable coupler and/or comprising an integral coupler, in whole or in part. For example, valve 100 can be configured to couple with one or more fittings 150 according to the disclosure, as further described below. The foregoing description regarding inlet 104 can apply similarly to one or more other inlets, outlets or other fluid ways of valve 100. For example, outlet 106 can include one or more outlet openings 106a, 106a' and/or one or more outlet conduits or outlet couplers. Alternatively, one or more of these components can be absent, as appropriate in accordance with a particular application. In the relevant field, some may refer to a valve as a "valve fitting," for example, when structure(s) such as conduits, connections, or couplers are present. As used in the present disclosure, the term "valve" includes "valve fittings" when referring to the device as a whole (e.g., valve 100), unless otherwise indicated.

Valve 100 can include one or more flow passages 108, such as a valve flow passage, fluid route or other flow path, for routing or otherwise directing fluid through the valve from inlet 104 to outlet 106 (or vice versa). Each flow passage 108 can include, or at least can be described to include for ease of illustration and explanation, two or more sub-flow passages (or component flow passages) that collectively make up the corresponding flow passage 108 through the valve. For example, in at least one embodiment, flow passage 108 can include one or more first passages 108a, such as an inlet or other flow passage, from inlet 104 to a location along passage 108 and one or more second flow passages 108b, such as an outlet or other flow passage, from such location to outlet 106. Valve 100 can include one or more other component flow passages as may be described in further detail elsewhere herein, separately or in combination with one another and/or any of first and second flow passages 108a, 108b. Further, each component flow passage can, but need not, comprise a plurality of passages or other paths between two or more points along flow passage 108.

Valve 100 can include one or more orifices 110, such as an opening, conduit or other passageway, for at least partially restricting or otherwise affecting flow through the valve. Orifice 110 can be disposed at least partially within flow passage 108, such as fluidicly between inlet 104 and outlet 106. Orifice 110 can be disposed at least partially within body 102, but need not be, and can alternatively be disposed outside of body 102 (wholly or partially) while nonetheless being configured for routing or otherwise allowing fluid to flow between inlet 104 and outlet 106 along flow passage 108. For example, orifice 110 can be disposed within a bypass or other conduit in fluid communication with another portion of flow passage 108 through or within body 102. Orifice 110 can, but need not, include a plurality of openings or other flow paths for defining a portion of one or more flow passages of valve 100, such as, for example, an orifice flow passage 111 forming a part of flow passage 108. Orifice 110 can include one or more orifice inlets 110a for allowing fluid to enter the orifice and one or more orifice outlets 110b for allowing fluid to exit the orifice. Orifice 110 can include one or more seats 122 for cooperating with a valve member 120 as further described below. In at least one embodiment, valve 100 or a portion thereof, such as valve body 102, can include a bowl 113, such as a reservoir or other space, for routing fluid through at least a portion of valve 100 and cooperating with one or more other valve components, such as an actuator assembly 116 or actuator 118 further described below. Orifice 110 can be disposed in fluid communication with bowl 113. Bowl 113 and/or one or more other valve components, such as valve body 102, can be configured to couple with one or more other valve components in any manner according to an implementation of the disclosure, such as sealingly, threadedly, removably, permanently, or otherwise, in whole or in part. For example, valve body 102 can include one or more covers 115, such as a top, lid, or other body portion, for enclosing at least a portion of bowl 113 and/or one or more other portions of valve 100. In at least one embodiment, valve 100 can include one or more couplers 109, such as screws, bolts, or other threaded or non-threaded fasteners, for coupling valve cover 115 with one or more other portions of valve body 102.

Valve 100 can include an actuator assembly 116, such as a solenoid actuator assembly, for controlling fluid flow through at least a portion of valve 100, separately or in cooperation with one or more other valve components. Actuator assembly 116 can be adapted to couple to one or more other valve components, such as valve body 102 or a component coupled to valve body 102, directly or indirectly, in whole or in part. In at least one embodiment, actuator assembly 116 can include an actuator 118, such as a solenoid actuator, and a housing 117, such as an at least partial enclosure, for holding or otherwise supporting one or more components of actuator assembly 116 and/or other valve components. Actuator 118 can be adapted for moving and/or retaining or otherwise holding one or more valve members 120 to, from or in one or more positions. Valve member 120 can have any number of positions according to a particular application. For example, valve member 120 can have a fully closed position for maximizing resistance to flow through at least a portion of valve 100, which can include preventing flow there through. As another example, valve member 120 can have a fully open position for minimizing resistance to flow through at least a portion of valve 100, such as by minimizing flow resistance caused by valve member 120 or a portion thereof. Valve member 120 can have one or more partially open (or partially closed) positions between the fully open and fully closed positions for allowing fluid flow at one or more rates between a maximum and a minimum flow rate, which can be any flow rate(s) according to an embodiment or implementation at hand.

Actuator 118 can be or include structure for holding one or more valve members 120 in one or more positions and for moving such valve member(s) among positions, such as between two or more of the positions described above. For example, actuator 118 can move valve member 120 between opened and closed positions with respect to orifice 110 or an orifice in fluid communication with orifice 110. Valve 100 can include one or more valve seats 122 for optionally coupling with a corresponding valve member 120. Valve seat 122 can, but need not, be a portion of orifice 110 (e.g., of orifice inlet 110a) and/or valve body 102, in whole or in part. Valve member 120 and one or more seats 122 can be configured to sealingly couple with one another for preventing or otherwise limiting fluid flow through one or more portions of flow passage 108, such as through orifice flow passage 111, in whole or in part. For instance, in at least one embodiment, valve 100 can have a fully closed position wherein valve member 120 and seat 122 are sealingly engaged for preventing flow into and/or through orifice 110 and one or more open positions wherein valve member 120 and seat 122 are not sealingly engaged and, rather, are disposed relative to one another for allowing fluid flow.

Actuator assembly 116 can be or include any type of solenoid actuator(s) and valve member(s) according to an implementation of the disclosure, whether now known or later developed. For example, in at least one embodiment, actuator 118 can include a solenoid coil 124 for generating a magnetic field and interacting with one or more other actuator components, which can include one or more at least partially fixed components, such as plunger housing 126, and one or more at least partially movable components, such as plunger 128. Valve member 120 can be coupled to plunger 128, which can be at least partially magnetic, and actuator 118 or a portion thereof, such as coil 124, can move plunger 128 and valve member 120 up and/or down or otherwise relative to one or more seats 122. Actuator assembly 116 can include one or more springs 130 for biasing plunger 128 in one or more directions or toward one or more positions, such as a default open or closed position in the absence of actuation force from coil 124 sufficient to overcome a biasing force of spring(s) 130. Actuator assembly 116 can include a base 132 for coupling actuator assembly 116 to one or more other valve components (e.g., valve body 102), threadingly, sealingly, or otherwise, whether separately or in combination with one or more other couplers, such as retainer 140 (e.g., a spring clip or other fastener) for coupling housing 117 with plunger housing 126. For example, base 132 can be adapted to couple with bowl 113, cover 115 and/or one or more other portions of valve body 102, separately or in combination, in whole or in part.

In at least one embodiment, valve 100 can include one or more fittings 150, such as an adapter, connector, or other coupler, for coupling with at least one of inlet 104 and outlet 106 and supporting fluid communication between valve 100 and one or more conduits or other fluid carriers for routing fluid into or out of valve body 102. As shown in the preferred embodiment of FIGS. 1-5 for illustrative purposes, which embodiment is but one of many, one or more fittings 150 of the present disclosure can be or include a cartridge style coupler that advantageously provides for both efficient and effective removable coupling with valve body 102 as well as crimp, or press, type coupling with a conduit or other flow system component fluidically coupled to valve 100. For purposes of convenience and explanation, the term "conduit" will be used hereinafter to refer not only to pipe, tubing and similar conduits typically used for routing fluid among valves and/or various other flow system components, but also to any flow system component that could be coupled to valve 100 in one or more of the manners described herein, including, but not limited to, pumps, other valves, fittings, fluid sources, fluid containers, heaters, coolers, metering equipment, monitoring equipment, throttling equipment and other flow system components, separately or in combination, in whole or in part.

More specifically, in at least one embodiment, fitting 150 can be or include one or more fitting bodies 152 having one end, such as first end 154 or another end, for removably coupling with valve body 102 and another end, such as second end 156 or another end, for coupling with a conduit by crimp or press fitting. Second end 156 can be or include any type of crimp or press fitting, whether now known or later developed, including, but not limited to, a fitting for being crimped or pressed radially inwardly onto the outside surface of a conduit disposed at least partially therein or, as another example, a fitting for having a conduit disposed at least partially thereon or thereover for being crimped or pressed radially inwardly onto the outside surface of the fitting, which can, but need not, involve utilization of a crimp ring or other crimp or compression device (e.g., commercial crimp rings, hose clamps) crimped onto at least one of the fitting and a conduit coupled to the fitting. All such fitting or connection types are hereinafter referred to generally as "crimp" fittings for purposes of convenience and explanation.

As shown in the exemplary embodiment of FIGS. 1-5, for example, second end 156 of fitting 150 can, in at least one embodiment, can be or include a crimp fitting for being crimpedly coupled about the exterior surface of a conduit (not shown) disposed at least partially within second end 156 (e.g., a copper or other pipe). In such an embodiment, which is but one of many, fitting 150 can include one or seal grooves 158 for holding one or more seals 160, such as a seal groove 158 extending radially outwardly from an interior surface 162 of fitting 150. An end of the conduit can be disposed within second end 156 and fitting 150 or one or more portions thereof, such as second end 156, groove 158 and/or seal 160, can be crimped or otherwise compressed about the exterior of the conduit for a fluid tight (or non-fluid tight, if desired) coupling between fitting 150 and the conduit. Such a coupling can, but need not, include plastic and/or elastic deformation of at least a portion of fitting 150 and can, but need not, involve utilization of one or more crimp rings (not shown), such as a copper, steel, or other ring or coupler for crimpedly coupling fitting 150 with one or more conduits. The illustrative embodiment of FIGS. 1-5 is but one example of many and, in at least one embodiment, fitting 150 can be adapted to couple with a conduit of any type and/or material. Some common examples can include pipe, tubing and other conduits made in whole or in part from copper, steel, another metal(s), or, as other examples, polyvinyl chloride (PVC), chlorinated polyvinyl chloride (CPVC), plastic, rubber, or cross-linked polyethylene (PEX). However, other conduits and conduit materials are possible. Similarly, fitting 150 or a portion thereof, such as second end 156 can be configured accordingly. For instance, second end 156 can be or include a straight tube for coupling with a PEX or other fitting (see, e.g., FIG. 6). As another example, second end 156 can be or include a tube having one or more external ridges or barbs (not shown) for coupling with PEX tubing or another flexible tubing. Valve 100 and/or fitting 150 can be made from any material according to an implementation of the disclosure, including, but not limited to, brass, lead-free brass, steel, stainless steel, plastic, copper, or other materials, separately or in combination, in whole or in part.

Turning back now to first end 154 of fitting 150, fitting 150 and valve body 102 can be adapted for removable coupling with one another. In at least one embodiment, valve 100 or a portion thereof, such as inlet 104 and/or outlet 106, can include one or more bores 134, such as a cylindrical or other fluid path, for fluidically coupling with at least a portion of fitting 150. Fitting 150 or a portion thereof, such as first end 154, can be configured for sliding and sealing engagement with at least a portion of one or more bores 134, which can include one or more inlet bores 134, one or more outlet bores 134 and/or one or more other bores, separately or in one or more combinations. In other words, in at least one embodiment, fitting 150 can be adapted for coupling with only an inlet bore, only an outlet bore, or only another bore; alternatively, fitting 150 can be adapted for coupling with a plurality of bores, which can be or include any bore or bores of valve 100 according to an implementation of the disclosure.

In at least one embodiment, fitting 150 or a portion thereof, such as first end 154, can have one or more external grooves 164, such as a seal groove disposed in exterior surface 168 of fitting 150, for holding one or more seals 166, such as an O-ring or other elastomeric seal. Seal(s) 166 and/or one or more other seals of valve 100 or fitting 150, such as seal 160, can be or include any type of seal according to an implementation of the disclosure, including, but not limited to, ethylene propylene diene terpolymer (EPDM), fluoroelastomer/fluorocarbon (FKM), and hydrogenated nitrile butadiene rubber (HNBR) seals, among others, such as metal seals, separately or in combination, in whole or in part. In at least one embodiment, fitting 150 can include one or more collars 170, such as an extension or lip, for coupling with one or more bores 134, which can include one or more flat or otherwise shaped shoulders 172. Collar 170 can, but need not, have an outside diameter or other dimension d1 different from, such as greater than, an outside diameter or other dimension d2 of another portion of fitting 150, such as second end 156 or another portion. In such an embodiment, which is but one of many, one or more grooves 164 (if present) can be disposed in collar(s) 170.

First end 154 of fitting 150 can be at least partially inserted into or otherwise disposed in sealing engagement with a bore 134 or portion thereof, such as interior surface 136. In at least one embodiment, valve body 102 can include one or more stops 138, such as a barrier or land, for limiting an extent to which fitting 150 can be disposed therein and fitting 150 or a portion thereof, such as first end 154 or a terminal end thereof, can be adapted to engage a stop 138 in one or more positions, such as a fully inserted or other position. Valve 100 can include one or more retainers 140, such as a clip, block or other coupler, for at least partially resisting uncoupling of fitting 150 from valve 100 or a portion thereof, such as a bore 134 in inlet 104 or outlet 106. In at least one embodiment, valve 100 or a portion thereof, such as valve body 102, inlet 104 and/or outlet 106, can include one or more slots 142, such as a hole or other opening, for receiving at least a portion of a retainer 140. For example, slot 142 can be in fluid communication with at least a portion of a bore 134 and retainer 140 can be disposed at least partially in or through slot 142 with at least a portion of retainer 140, such as one or more fingers 140a, 140b, disposed at least partially within bore 134. When retainer is in one or more positions, such as a coupled position, one or more fingers 140a, 140b can be disposed radially interior of interior surface 162 or a portion thereof and can at least partially limit or restrict movement of fitting 150 relative to valve body 102 in one or more directions, such as longitudinally along central longitudinal axis X of valve 100. For instance, in at least one embodiment, fingers 140a, 140b and/or one or more other portions of retainer 140 can be adapted for engaging shoulder 172, collar 170 or another portion of fitting 150 (such as a groove or the like) for at least partially resisting removal of fitting 150 or a portion thereof, such as first end 154, from bore 134.

In these manners, it will be appreciated that the valves 100 and fittings 150 according to the disclosure can provide a relatively quick and easy manner for coupling and/or uncoupling a crimp fitting to a valve, which can make for efficient and cost-effective installation of such valves and fitting into a flow control or other fluid system. Similarly, it will be appreciated that the valves 100 and fittings 150 according to the disclosure can provide for relatively quick and easy valve and/or fitting replacement, such as upon end of life cycle or repurposing of a valve. As another example, the valves 100 and fittings 150 according to the disclosure can provide for relatively quick, easy and cost effective fitting replacement, such as in the event of a bad or otherwise failed crimp during installation.

With continuing reference to the Figures, and particular reference to FIG. 7, another of many embodiments of a valve according to the disclosure is illustrated. In at least one embodiment, a valve 200 can have one or more crimp fittings 250, each of which can be the same as or similar to valve 100 and fitting 150 described above in one or more respects, separately or in combination, in whole or in part. However, instead of being configured for removable coupling with a valve or portion thereof, such as a valve body, inlet or outlet, fitting 250 can be formed integrally with one or more other portions of valve 200, such as valve body 202, inlet 204 or outlet 206. Such integral formation can be accomplished in any manner according to an implementation of the disclosure, such as, for example, by way of molding, casting, machining, welding, or another method of manufacture. In at least some implementations, such an embodiment of a valve according to the disclosure can save time and money associated with installation or modification of a flow control system by at least partially reducing the number of parts involved and the time that can be needed for connecting a valve to one or more conduits.

The systems and methods disclosed herein are not limited to the exemplary valve types shown in the Figures for illustrative purposes and can be applicable or applied to many different types and styles of valves, valve components and valve systems. Further, while the teachings of the disclosure can be particularly advantageous for solenoid valves, they are not necessarily limited thereto and valves 100, 200 can be or include any type of valve, whether now known or later developed, such as, for example, linear, rotary, solenoid, pilot, diaphragm, mechanical, electromechanical, hydraulic, pneumatic and other types of valves for manipulating the passage of one or more fluids across a distance or point, separately or in combination, in whole or in part. The term "fluid(s)" as used herein includes any substance or material capable of flowing, such as, for example, liquid(s), gas(es) and combinations thereof (regardless of whether one or more solids or other non-fluids may be present therein).

In at least one embodiment, a valve can include a valve body having an inlet that allows fluid flow into the valve body, an outlet that allows fluid flow out of the valve body and an orifice disposed fluidically between the inlet and the outlet, a fitting having a first end configured to be removably coupled with at least one of the inlet and the outlet of the valve body and a second end configured to be coupled to a fluid conduit, and a retainer configured to at least partially resist uncoupling of the fitting from the valve body, such as when the fitting is coupled to the valve body. A valve body can include one or more bores, such as a first, second, or other bore, and one or more ends of a fitting can be configured to slidingly and sealingly engage at least a portion of one or more bores. One or more retainers can be configured to couple with at least one of a valve body or portion thereof, such as an inlet, outlet, or other portion, and one or more ends or other portions of a fitting. One or more bores can be disposed in one or more inlets and/or one or more outlets of a valve body.

A valve can include a plurality of bores, which can include a second, third, or other bore. A bore can be disposed in one or more inlets of a valve body and a bore can be disposed in one or more outlets of a valve body. One or more ends or other portions of one or more fittings can be configured to slidingly and/or sealingly engage or otherwise couple with at least a portion of one or more bores. A valve can include one or more bores and one or more corresponding or other fittings. A first or other bore can be disposed in an inlet of a valve body and a second or other bore can be disposed in an outlet of a valve body. A first or other end of one or more fittings can be configured to slidingly and/or sealingly engage at least a portion of a second or other bore.

A valve can include one or more bores, such as a first bore and a second bore, having a common central longitudinal or other axis, or no common axis. One or more fittings can be or include a crimp fitting, such as a crimp fitting having one or more ends or other portions configured to be coupled to a fluid conduit or other fluid carrier by crimping, which can include by way of coupling with a crimp ring or other crimp or press style coupler, internally, externally, or otherwise.

A first or other end of a fitting can include one or more seal grooves and can include one or more seals coupled to the one or more seal groves, such as one or more seals configured to sealingly engage an interior surface or other portion of one or more bores, inlet, outlets, or fluid paths. A valve body can include one or more slots or other openings in fluid communication with one or more bores and at least a portion of one or more retainers can be configured to couple with one or more slots or other openings. One or more retainers can include one or more fingers configured to be at least partially disposed within a bore, such as when a retainer is at least partially coupled with a slot or other portion of a valve. One or more fingers can be configured to at least partially resist movement of one or more fittings relative to a bore or other valve portion.

An end or other portion of one or more fittings can include a collar, such as a collar having a larger or other outside dimension than one or more other portions of a fitting. One or more stops can be disposed at least partially within a valve, such as fluidically between an orifice and a bore, and a collar can be configured to contact a stop, such as when a fitting is in one or more positions, such as a fully inserted or other position. A valve body can include a slot in fluid communication with a bore and a collar can be configured to be disposed longitudinally or otherwise between or otherwise relative to a stop and a slot, such as when the fitting is in one or more positions, such as an inserted, coupled, or other position.

At least a portion of a retainer can be configured to couple with a slot, and a retainer can include one or more fingers configured to be at least partially disposed within a bore, such as on a side of a collar opposite one or more stops, e.g., when a fitting is in one or more inserted positions. One or more seal grooves can be disposed in a collar or other portion of a fitting and one or more seals can be coupled to one or more seal grooves and configured to sealingly engage an interior or other surface of one or more bores. A second or other end of one or more fittings can include one or more seal grooves, such as seal grooves that extend radially outwardly from an interior surface of a fitting and can include one or more seals coupled to the one or more seal grooves.

In at least one embodiment, a valve can include a valve body having an inlet that allows fluid flow into the valve body, an outlet that allows fluid flow out of the valve body and an orifice disposed fluidically between the inlet and the outlet, a fitting having a first end configured to be removably coupled with at least one of the inlet and the outlet of the valve body and a second end configured to be coupled to a fluid conduit, and a retainer configured to at least partially resist uncoupling of the fitting from the valve body, such as when the fitting is coupled to the valve body. The inlet can include a first bore and the outlet can include a second bore. The first end of the fitting can be configured to slidingly and sealingly engage at least a portion of the first bore, and the first end of the fitting can be configured to slidingly and sealingly engage at least a portion of the second bore. A retainer can be configured to couple with at least one of the valve body and the first end of the fitting.

A fitting can be or include a crimp fitting or crimp fitting portion, in whole or in part, separately or in combination with one or more other types of fittings or fitting portions. One or more ends of the fitting can be configured to be coupled to a fluid conduit by crimping or pressing. A fitting can be a first fitting and a valve can include a second fitting having a first end configured to slidingly and sealingly engage at least a portion of a first bore and at least a portion of a second bore. First and second or other fittings can be configured to be optionally and/or interchangeably connectable to one or more of the inlet and outlet of a valve, or other portions of a valve. An inlet can include a first slot in fluid communication with a first bore and an outlet can include a second slot in fluid communication with a second bore. A valve can include one or more retainers, such as a retainer configured to be disposed at least partially through at least one of the first and second slots and to couple with one or more fittings at least partially inside at least one of a first, second or other bore. A fitting can include one or more collars having one or more shoulders or other portions and one or more retainers can be configured to engage one or more shoulders or other portions of one or more collars.

Other and further embodiments utilizing one or more aspects of the systems and methods described above can be devised without departing from the spirit of Applicants' disclosures. For example, the systems and methods disclosed herein can be used alone or to form one or more parts of other valves, valve components and/or fluid control systems, as well as of flow control components other than valves. Further, the various methods and embodiments of the valves and fittings can be included in combination with each other to produce variations of the disclosed methods and embodiments. Discussion of singular elements can include plural elements and vice-versa. References to at least one item followed by a reference to the item can include one or more items. Also, various aspects of the embodiments can be used in conjunction with each other to accomplish the understood goals of the disclosure.

Unless the context requires otherwise, the words "comprise," "include," and "has" (including variations and conjugations thereof, such as "comprises," "including," "have" and so forth) should be understood to imply the inclusion of at least the stated element or step or group of elements or steps or equivalents thereof, and not the exclusion of a greater numerical quantity or any other element or step or group of elements or steps or equivalents thereof. The devices, apparatuses and systems can be used in a number of directions and orientations. The order of steps can occur in a variety of sequences unless otherwise specifically limited. The various steps described herein can be combined with other steps, interlineated with the stated steps, and/or split into multiple steps. Similarly, elements have been described functionally and can be embodied as separate components and/or can be combined into components having multiple functions.

The embodiments have been described in the context of preferred and other embodiments and not every embodiment of Applicants' disclosure has been described. Obvious modifications and alterations to the described embodiments are available to those of ordinary skill in the art having the benefits of the present disclosure. The disclosed and undisclosed embodiments are not intended to limit or restrict the scope or applicability of Applicants' disclosures, but rather, in conformity with the patent laws, Applicants intend to fully protect all such modifications and improvements that come within the scope or range of equivalents of the claims.

What is claimed is:

1. A valve, comprising:
   a valve body having an inlet that allows fluid flow into the valve body, an outlet that allows fluid flow out of the valve body and an orifice disposed fluidically between the inlet and the outlet;
   a fitting having a first end configured to be removably coupled with at least one of the inlet and the outlet of the valve body and a second end configured to be crimped to a fluid conduit, thereby providing a removable crimp connection; and
   a retainer configured to at least partially resist uncoupling of the fitting from the valve body when the fitting is coupled to the valve body;
   wherein the valve body comprises a first bore;
   wherein the first end of the fitting is configured to slidingly and sealingly engage at least a portion of the first bore;
   wherein the retainer is configured to couple with at least one of the valve body and the first end of the fitting;
   wherein the first bore is disposed in either the inlet or the outlet of the valve body; and
   wherein the valve body comprises a slot disposed in a top surface of the valve body and in fluid communication with the first bore and wherein at least a portion of the retainer is configured to couple with the slot.

2. The valve of claim 1, further comprising a second bore, wherein the first bore is disposed in the inlet of the valve body and the second bore is disposed in the outlet of the valve body, and wherein the first end of the fitting is configured to slidingly and sealingly engage at least a portion of the second bore.

3. The valve of claim 1, further comprising a second bore and a second fitting, wherein the first bore is disposed in the inlet of the valve body and the second bore is disposed in the outlet of the valve body, and wherein a first end of the second fitting is configured to slidingly and sealingly engage at least a portion of the second bore.

4. The valve of claim 3, wherein the first bore and the second bore have a common central longitudinal axis.

5. The valve of claim 1, wherein the first end of the fitting comprises a seal groove and further comprising a seal coupled to the seal groove and configured to sealingly engage an interior surface of the first bore.

6. The valve of claim 1, wherein the retainer comprises one or more fingers configured to be at least partially disposed within the bore when the retainer is coupled to the slot.

7. The valve of claim 6, wherein the one or more fingers are configured to at least partially resist movement of the fitting relative to the bore.

8. The valve of claim 1, wherein the first end of the fitting comprises a collar having a larger outside dimension than the second end of the fitting.

9. The valve of claim 8, further comprising a stop disposed fluidically between the orifice and the first bore and wherein the collar is configured to contact the stop when the fitting is in a fully inserted position.

10. The valve of claim 9, wherein the entire collar is configured to be disposed longitudinally between the stop and the slot when the fitting is in the fully inserted position.

11. The valve of claim 10, wherein the retainer comprises one or more fingers configured to be at least partially disposed within the bore on a side of the collar opposite the stop, and in retaining engagement with the side of the collar opposite the stop, when the fitting is in the fully inserted position.

12. The valve of claim 8, further comprising a seal groove disposed in the collar and a seal coupled to the seal groove and configured to sealingly engage an interior surface of the first bore.

13. The valve of claim 1, wherein the second end of the fitting comprises a seal groove that extends radially outwardly from an interior surface of the fitting and further comprising a seal coupled to the seal groove.

14. The valve of claim 1, wherein the first end of the fitting can be removably coupled with only one of the inlet and the outlet of the valve body.

15. A valve, comprising:
   a valve body having an inlet that allows fluid flow into the valve body, an outlet that allows fluid flow out of the valve body and an orifice disposed fluidically between the inlet and the outlet;
   a fitting having a first end configured to be removably coupled with the inlet and the outlet of the valve body and a second end configured to be crimped to a fluid conduit, thereby providing a removable crimp connection between the valve body and the fluid conduit; and
   a retainer configured to at least partially resist uncoupling of the fitting from the valve body when the fitting is coupled to the valve body;
   wherein the inlet comprises a first bore and the outlet comprises a second bore;
   wherein the first end of the fitting is configured to slidingly and sealingly engage at least a portion of the first bore;
   wherein the first end of the fitting is configured to slidingly and sealingly engage at least a portion of the second bore;
   wherein the retainer is configured to couple with at least one of the valve body and the first end of the fitting; and
   wherein the inlet comprises a first slot in fluid communication with the first bore and the outlet comprises a second slot in fluid communication with the second bore, and further comprising a retainer configured to be disposed at least partially through at least one of the first and second slots and to couple with the fitting at least partially inside at least one of the first and second bores.

16. The valve of claim 15, wherein the fitting is a first fitting, further comprising a second fitting having a first end configured to slidingly and sealingly engage at least a portion of the first bore and at least a portion of the second bore, and wherein the first and second fittings are configured to be optionally and interchangeably connectable to the inlet and the outlet of the valve.

17. The valve of claim 15, wherein the fitting comprises a collar having a shoulder and wherein the retainer is configured to engage the shoulder.

* * * * *